J. F. & H. E. DODGE.
SHAFT ADJUSTING MEANS.
APPLICATION FILED AUG. 19, 1914.
1,183,283.
Patented May 16, 1916.
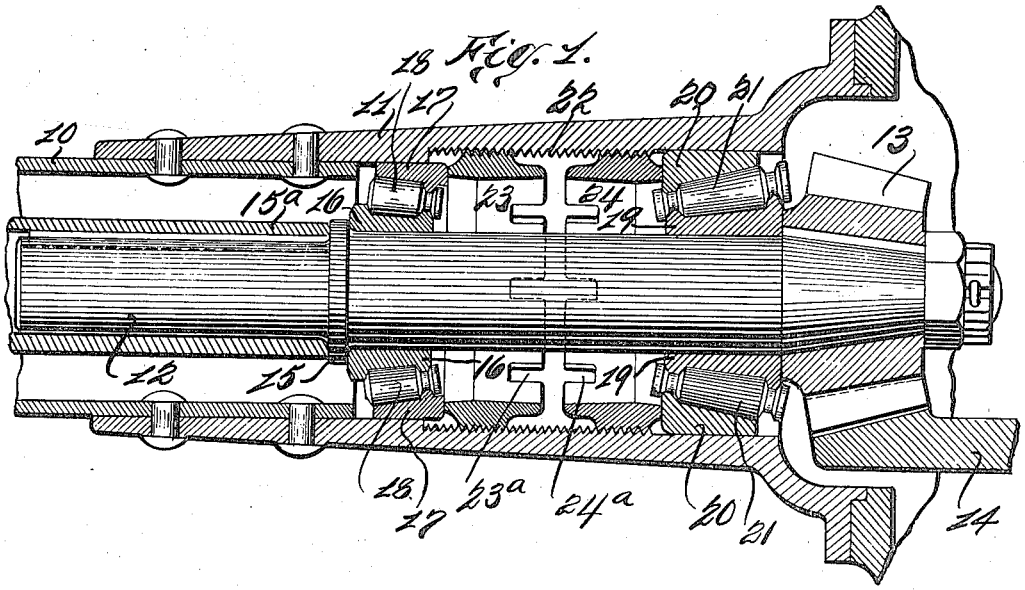
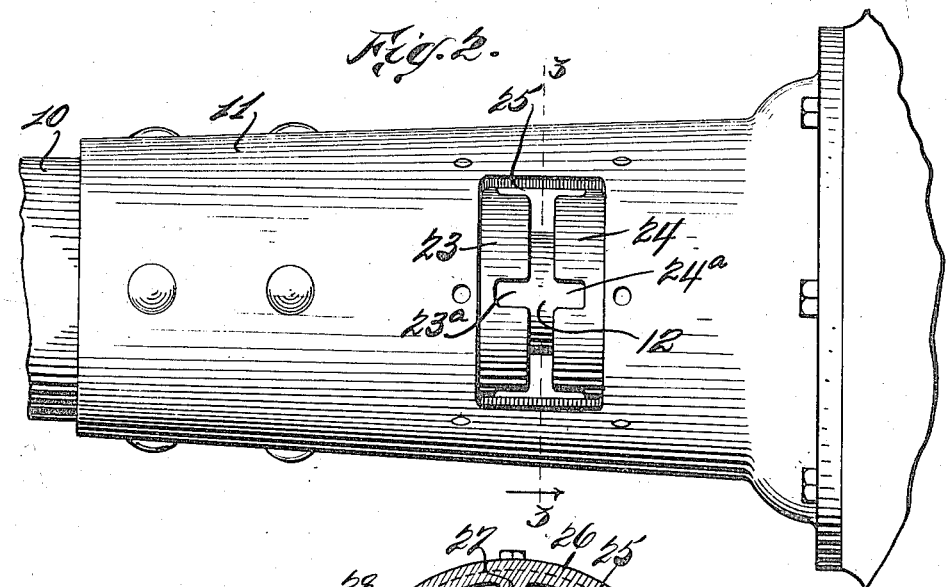
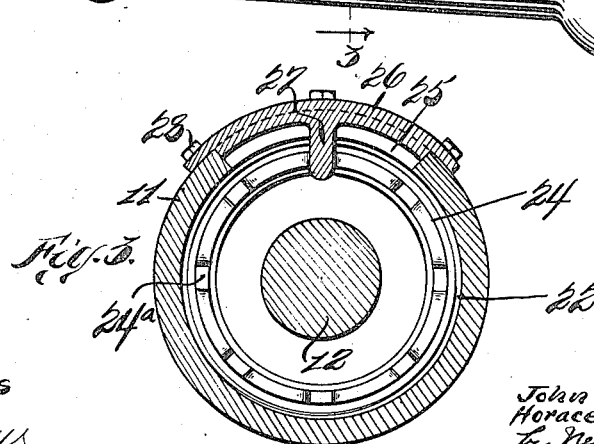
Witnesses
E. A. Jarms
A. Bernstein
Inventors
John F. Dodge.
Horace E. Dodge.
by Newell Neal
attorneys.

UNITED STATES PATENT OFFICE.

JOHN F. DODGE, OF DETROIT, AND HORACE E. DODGE, OF GROSSE POINTE, MICHIGAN, ASSIGNORS TO DODGE BROTHERS, OF DETROIT, MICHIGAN, A CORPORATION OF MICHIGAN.

SHAFT-ADJUSTING MEANS.

1,183,283.   Specification of Letters Patent.   Patented May 16, 1916.

Application filed August 19, 1914. Serial No. 857,482.

*To all whom it may concern:*

Be it known that we, JOHN F. DODGE and HORACE E. DODGE, citizens of the United States, residing at Detroit, Michigan, and Grosse Pointe, Michigan, respectively, have invented certain new and useful Improvements in Shaft-Adjusting Means, of which the following is a clear, full, and exact description.

This invention relates to shaft adjusting means and more particularly relates to means for adjusting the drive-shaft of automobiles in such way as to properly set the driving pinion of the differential so as to mesh properly with its companion gear.

One of the objects of the invention is to provide means for longitudinally adjusting a shaft in its housing, in such way that in the different adjusted positions the end thrust of the shaft in both directions will be properly supported and resisted.

Another object is to provide shaft adjusting means of the character specified, which is also adapted to adjust the parts of the bearing and take up wear thereof.

Another object of the invention is to provide means in common with the thrust resisting devices for locking them in a set position.

Other objects of the invention are to provide simple, efficient and practical means for adjusting a shaft.

These being among the objects of the present invention, the same consists of certain features of construction and combinations of parts to be hereinafter described and then claimed with reference to the accompanying drawings illustrating a suitable embodiment of the invention, and in which—

Figure 1 is a longitudinal section of a shaft adjusting means according to the present invention; Fig. 2 is a side elevation of the same; and Fig. 3 is a transverse section on the line 3—3 Fig. 2.

Referring to the drawings, the members 10 and 11 constitute a housing such as that for the main drive-shaft 12 of an automobile or motor driven car. Said shaft carries a keyed-on pinion 13 which meshes with a companion gear 14, said gears constituting a part of the differential. On said shaft and spaced at a suitable distance away from said pinion 13 is an abutment 15, while the pinion 13 constitutes another abutment, said abutments being adapted to transmit the end thrusts of said shaft in both directions to intermediate devices. Preferably the said abutment 15 is produced by flaring or expanding the inner end of a tube 15$^a$ which is fitted over the shaft 12, and the abutment is formed by the edge of said flared end. The shaft 12 is formed correspondingly to the flared or enlarged end of said tube 15$^a$. The shaft and tube are permanently united as by a weld joint.

Located in coöperative relationship to the abutment 15 is a bearing preferably comprising race rings 16 and 17 and rolling bodies such for instance as rollers 18. In coöperative relationship to the abutment furnished by the pinion 13 is another bearing, preferably comprising race rings 19 and 20 and rolling bodies such as rollers 21. The shaft 12 passes through and in contact with the inner race rings 16 and 19 of the roller-bearings, while the outer race rings 17 and 20 thereof have contact with the inner wall of the housing section 11. Two bearings are therefore illustrated located between the abutments 13 and 15. Of course cages will usually be employed for holding the rolling bodies.

The housing section 11 is screw-threaded on its inner wall at 22, which screw-thread is arranged between the two bearings. Having screw engagement with the threaded portion of the housing section 11 are castellated or other suitable form of externally screw-threaded nuts or collars 23 and 24. The nut 23 is arranged in operative relationship to the bearing toward one end of shaft 12, while the nut 24 is arranged in operative relationship to the other bearing. If the said nuts are of castellated form and are arranged substantially as shown, nut 23 will present notches or recesses 23$^a$ toward the other nut and the nut 24 will present notches or recesses 24$^a$ toward nut 23, said notches or recesses, in each series, preferably being equally spaced apart. When said nuts are arranged and constructed as shown, means in common with both of said nuts may be provided for locking them in position. To this end an aperture 25 is provided in the wall of the housing section 11, at a point of convenient access opposite the nuts 23 and 24, and said aperture may be closed as by a segmental plate or cover 26 which is provided at its mid-length with an inwardly projected tongue or key 27 and is secured to the said housing as by means of suitable removable fastenings 28.

Constructed, as shown in the drawings, the method of manipulating the parts, for the adjustment of the shaft 12 longitudinally of the housing is as follows: The aperture 25 in the housing is uncovered so that access may be gained to the nuts 23 and 24. By means of a suitable hand-tool, one of the nuts, as for instance 23, may be turned so as to move it away from its related roller-bearing or from the abutment 15. The hand-tool may now be applied to the other nut 24 and by turning it in such direction as to move it away from the nut 23, the shaft 12 is longitudinally shifted with the pinion 13 in the direction in which nut 24 is shifted, through the medium of the interposed roller-bearing, if one be located at this point.

Such an adjustment by nut 24 will move the shaft 12 to the right, and the said shaft is finally set in such position by applying the hand-tool again to the nut 23 and turning it in a reverse direction, until the shaft is set against appreciable longitudinal movement in either direction. When the improved nut locking means as shown is provided, care should be taken that the notches in each nut come opposite the notches in the other nut, and that one pair of notches be set to such position that when the cover or plate 26 is applied in proper position on the housing, the key or tongue 27 will engage with the walls of both notches. The cover is then secured in position.

It is obvious that some, if not all, of the advantages of the present invention may be obtained by the modification of some of the parts, or by omitting or adding other parts, and still be within the scope of the invention, and therefore we do not limit ourselves to the preferred embodiment of our invention illustrated.

What we claim as new is:—

1. In a shaft adjusting means, the combination of an internally screw-threaded housing, a shaft located in said housing, shaft bearings fitted to said housing beyond the screw-threaded portion thereof and held on said shaft against outward movement relatively to each other, and externally screw-threaded nuts located between said bearings in engagement with said screw-threaded portion of said housing, and adapted to be set in outward adjusted positions toward said bearings.

2. In a shaft adjusting means, the combination of an internally screw-threaded housing, a shaft located in said housing, shaft bearings located in said housing and held against outward movement relatively to said shaft, and externally screw-threaded nuts separate from and located between said bearings in engagement with the screw-threaded portion of said housing, and adapted to be set in outward adjusted positions toward said bearings, said nuts having, at their adjacent sides, means whereby they are adapted to be turned.

3. In a shaft adjusting means, the combination of an internally screw-threaded housing, a shaft located in said housing, shaft bearings located in said housing and held against outward movement relatively to said shaft, and externally screw-threaded nuts located between said bearings in engagement with the screw-threaded portion of said housing, and adapted to be set in outward adjusted positions toward said bearings, and means in common with said nuts for locking them against turning.

4. In a shaft adjusting means, the combination of a housing, a longitudinally adjustable shaft arranged in said housing, and provided with an abutment and a pinion spaced away from said abutment, and constituting another abutment, bearings arranged between said abutments to receive the end thrust of said shaft through the medium of said abutments, and a pair of nuts or collars arranged between said bearings to bear in opposite directions on said bearings, and provided with means for adjusting them relatively to said housing and for fixing them against longitudnal movement relatively to said housing.

5. In a shaft adjusting means, the combination of a housing having an opening, a longitudinally adjustable shaft arranged in said housing and provided with spaced abutments, bearings arranged to receive the end thrust of said shaft in both directions, through the medium of said abutments, a pair of nuts between said bearings, having screw-connection with said housing, and adapted to bear against said bearings, and cover means fixed to cover said housing opening and provided with means for locking said nuts against turning.

6. In a shaft adjusting means, the combination of a housing having an opening, a longitudinally adjustable shaft arranged in said housing and provided with spaced abutments, bearings arranged to receive the end thrust of said shaft in both directions, through the medium of said abutments, a pair of castellated nuts between said bearings, having screw connection with said housing, and adapted to bear against said bearings, and cover means fixed to cover said housing opening and provided with a key adapted for a common engagement with the castellated portions of said nuts for locking said nuts against turning.

7. In a shaft adjusting means, the combination of a housing, a shaft therein, separate shaft bearings adjustably mounted in said housing and spaced apart longitudinally of said shaft, two means for adjusting said bearings and shaft, and a single key carried by said housing for locking said two adjusting means and said spaced bearings in set position.

8. In a shaft adjusting means, the combination of a housing having an opening for receiving a hand tool, a shaft arranged in said housing, a nut having a screw connection with said housing and adapted to be rotated by said tool when it is introduced through said housing-opening, means whereby the end thrust of said shaft is transmitted to said nut, and means mounted on said housing and extending through said opening for locking said nut against turning.

9. In a shaft adjusting means, the combination of a stationary housing, a shaft located in said housing, two spaced abutments on said shaft, one of which is formed by a pinion located on said shaft, a spaced pair of roller bearings for said shaft, arranged between said abutments, and a pair of nuts located between said bearings and having screw connection with said housing, whereby the end thrust of said shaft in one direction is transmitted through one of said abutments to one of said nuts and the end thrust in the opposite direction is transmitted through the other abutment to the other nut, and so that said shaft may be adjusted longitudinally of said housing.

10. In a shaft adjusting means, the combination of a stationary housing, a shaft located in said housing, two spaced abutments on said shaft, one of which is formed by a pinion, a spaced pair of bearings on said shaft, arranged between said abutments and guided on said housing, and variably adjustable means located between said bearings and having screw connection with said housing, whereby the bearings may be adjusted in opposite directions and the end thrust of said shaft taken up by said adjusting means.

11. In a shaft adjusting means, the combination of a housing, a shaft located in said housing, two oppositely facing abutments projected laterally from said shaft, bearing members fitted directly to said shaft and located on opposite sides of said abutments to take the thrust in each direction, and means carried on the housing and accessible between said bearing members from the outside thereof for adjusting said parts longitudinally of said housing and holding said shaft in its adjusted position.

12. In a shaft adjusting means, the combination of a housing having a lateral opening, a shaft located in said housing, two oppositely facing abutments on said shaft, bearing members for said shaft located on opposite sides of said abutments to take the thrust in each direction, and means screw-threaded on the housing and accessible from the outside thereof by means of a hand tool introduced through said opening for adjusting said parts longitudinally of said housing and holding said shaft in its adjusted position.

13. In a shaft adjusting means, the combination of a stationary housing, a shaft located in said housing, two spaced abutments on said shaft, a spaced pair of bearings on said shaft, arranged between said abutments, each bearing comprising an inner ring or cone, a series of tapered rollers and a tapered ring or cup, the latter being guided upon said housing, and variably adjustable means having screw connection with said housing, whereby the bearings may be adjusted in opposite directions and the end thrust of said shaft taken by said adjusting means, and the wear on said bearings taken up.

14. In a shaft adjusting means, the combination of a housing, a shaft arranged in said housing, a nut having a screw connection with said housing, means fitted directly to said shaft whereby the end thrust of said shaft is first transmitted directly to said means and then to said nut, in one direction, a second nut having a screw connection with said housing, and means fitted directly to said shaft whereby the end thrust of said shaft in opposite direction is first transmitted directly to said means and then to said second nut, said nuts being arranged in juxtaposition between the two said means.

Signed at Detroit, Mich. this 31 day of July 1914.

JOHN F. DODGE.
HORACE E. DODGE.

Witnesses:
W. R. WILSON,
G. W. MASON.